US012752624B2

(12) United States Patent
Hirota et al.

(10) Patent No.: US 12,752,624 B2
(45) Date of Patent: Oct. 6, 2026

(54) DISPLAY CONTROL DEVICE, DISPLAY METHOD, AND STORAGE MEDIUM STORING DISPLAY PROGRAM

(71) Applicant: TOYOTA JIDOSHA KABUSHIKI KAISHA, Toyota (JP)

(72) Inventors: Takahiro Hirota, Nukata-gun (JP); Yuting Zhang, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 225 days.

(21) Appl. No.: 17/840,089

(22) Filed: Jun. 14, 2022

(65) Prior Publication Data

US 2022/0410711 A1 Dec. 29, 2022

(30) Foreign Application Priority Data

Jun. 23, 2021 (JP) ................................ 2021-104425

(51) Int. Cl.

| | |
|---|---|
| ***B60K 35/28*** | (2024.01) |
| ***B60K 35/10*** | (2024.01) |
| ***B60K 35/22*** | (2024.01) |
| ***B60K 35/23*** | (2024.01) |
| ***B60K 35/29*** | (2024.01) |

(52) U.S. Cl.

CPC .............. *B60K 35/28* (2024.01); *B60K 35/10* (2024.01); *B60K 35/22* (2024.01); *B60K 35/23* (2024.01); *B60K 35/29* (2024.01); *B60K 2360/16* (2024.01); *B60K 2360/186* (2024.01)

(58) Field of Classification Search

CPC .. B60K 35/23; B60K 2360/177; B60K 35/00; B60K 35/28; B60K 35/29; B60K 2360/16; B60K 2360/186; B60K 2360/166; B60R 1/001; B60R 16/02

See application file for complete search history.

(56) References Cited

U.S. PATENT DOCUMENTS

2012/0185165 A1* 7/2012 Geelen .................. G01C 21/26 701/436
2016/0327402 A1* 11/2016 Funabiki ................ B60K 35/29
(Continued)

FOREIGN PATENT DOCUMENTS

JP 2017-67515 A 4/2017
JP 2017067515 A * 4/2017
(Continued)

OTHER PUBLICATIONS

Machine translation of JP-2017067515-A (Year: 2017).*

*Primary Examiner* — Navid Z. Mehdizadeh
*Assistant Examiner* — Caitlin R Mccleary
(74) *Attorney, Agent, or Firm* — Oblon, McClelland, Maier & Neustadt, L.L.P.

(57) ABSTRACT

A display control device includes a processor. The processor is configured to acquire a travel route of a vehicle, in a case in which the vehicle, traveling on a travel path, changes a travel direction to another travel path, set a display position of a guidance display that guides the travel direction with respect to a display region of a display unit, on the basis of a positional relationship between the display region and the other travel path, and display the guidance display, the display position of which has been set relative to a view ahead of the vehicle, so as to be superimposed on the display region.

5 Claims, 9 Drawing Sheets

(56) References Cited

U.S. PATENT DOCUMENTS

| | | | | |
|---|---|---|---|---|
| 2017/0336222 | A1* | 11/2017 | Yamaguchi | B60K 35/00 |
| 2019/0025580 | A1* | 1/2019 | Nagano | H04N 9/3185 |
| 2019/0204103 | A1* | 7/2019 | Kimura | B60K 35/23 |
| 2020/0047686 | A1* | 2/2020 | Higashiyama | G02B 27/0149 |
| 2020/0400455 | A1* | 12/2020 | Wakayanagi | G08G 1/16 |
| 2021/0104212 | A1* | 4/2021 | Horihata | B60K 35/23 |
| 2021/0356289 | A1* | 11/2021 | Horihata | G01C 21/3644 |
| 2021/0372810 | A1 | 12/2021 | Hato et al. | |
| 2022/0036598 | A1* | 2/2022 | Kim | G06F 3/147 |
| 2022/0172652 | A1* | 6/2022 | Yagyu | G09G 3/001 |

FOREIGN PATENT DOCUMENTS

| | | | |
|---|---|---|---|
| JP | 2020-112542 | A | 7/2020 |
| JP | 2020-132137 | A | 8/2020 |
| WO | WO 2013/080310 | A1 | 6/2013 |

* cited by examiner

DISPLAY CONTROL DEVICE, DISPLAY METHOD, AND STORAGE MEDIUM STORING DISPLAY PROGRAM

CROSS-REFERENCE TO RELATED APPLICATION

This application is based on and claims priority under 35 USC 119 from Japanese Patent Application No. 2021-104425 filed on Jun. 23, 2021, the disclosure of which is incorporated by reference herein.

BACKGROUND

Technical Field

The present disclosure relates to a display control device, a display method, and a storage medium storing a display program.

Related Art

Japanese Patent Application Laid-Open (JP-A) No. 2020-132137 discloses a display control device that controls display of a HUD. This display control device displays superimposed content on a specific object of superimposition that exists in the view ahead of the vehicle.

For example, in FIG. 8 of the aforementioned publication, a travel direction guide that is substantially triangular is displayed so as to be superimposed on the view ahead of a vehicle along a road onto which the vehicle is to make a left turn.

In the display control device of JP-A No. 2020-132137, the travel direction guide is superimposed on the travel path on which the vehicle is to travel from here on, and therefore, there is the concern that the driver may find the display of the guide annoying.

SUMMARY

An object of the present disclosure is to provide a display control device, a display method, and a storage medium storing a display program, which carry out display that guides a change in course while reducing annoyance.

A display control device of a first aspect has a processor, wherein the processor: acquires a travel route of a vehicle; in a case in which the vehicle, traveling on a travel path, changes a travel direction to another travel path, sets a display position of a guidance display that guides the travel direction with respect to a display region of a display unit, on the basis of a positional relationship between the display region and the other travel path; and displays the guidance display, the display position of which has been set relative to a view ahead of the vehicle, so as to be superimposed on the display region.

The display control device of the first aspect is structured to display a guidance display, which guides the travel direction, on a display region of a display unit so as to be superimposed on the view ahead of the vehicle. On the basis of the travel route acquired by the processor, the display control device determines, for example, whether or not the vehicle that is traveling on the travel path will change course to another travel path. In a case in which the course is to be changed to another travel path, the processor sets the display position of the guidance display with respect to the display region of the display unit, on the basis of the positional relationship between the display region and the other travel path. Due thereto, for example, in a case in which another travel path on which the vehicle will travel from here on exists in front on the driver's sightline, it is possible to avoid superimposition of the guidance display on the view of the other travel path. Therefore, the annoyance of the guidance display being superimposed on the view of the other travel path can be reduced.

A display control device of a second aspect is the display control device of the first aspect, wherein the processor sets the display position of the guidance display at a side of the other travel path in the display region in a case in which the other travel path exists outside the display region, and sets the display position of the guidance display at a side of the travel path in the display region in a case in which the other travel path exists inside the display region.

In the display control device of the second aspect, the processor sets the display position of the guidance display, in a case in which the other travel path exists outside the display region, at the other travel path side of the display region. Because the other travel path is not in front on driver's sightline, even if the guidance display is displayed so as to be superimposed on the other travel path, there is little annoyance. On the other hand, the processor sets the display position of the guidance display, in a case in which the other travel path exists inside the display region, at the travel path side of the display region. The annoyance of the guidance display being superimposed on the view of the other travel path can thereby be reduced.

A display control device of a third aspect is the display control device of the first aspect, wherein the processor sets the display position of the guidance display at a side of the other travel path in the display region in a case in which the other travel path is not visible, and sets the display position of the guidance display at a side of the travel path in the display region in a case in which the other travel path is visible.

In the display control device of the third aspect, the processor sets the display position of the guidance display, in a case in which the other travel path is not visible, at the other travel path side of the display region. Because the other travel path is not visible, even if the guidance display is displayed so as to be superimposed on the other travel path, there is little annoyance. On the other hand, the processor sets the display position of the guidance display, in a case in which the other travel path is visible, at the travel path side of the display region. The annoyance of the guidance display being superimposed on the view of the other travel path can thereby be reduced.

A display control device of a fourth aspect is the display control device of any one of the first through third aspects, in a case in which the other travel path exists at a side of a travel lane in a case in which the travel path has the travel lane and an oncoming lane, the processor sets the display position of the guidance display at a near side of an intersection between the travel path and the other travel path and, in a case in which the other travel path exists at a side of the oncoming lane, the processor sets the display position of the guidance display at a far side of the intersection.

In the display control device of the fourth aspect, in a case in which the other travel path exists at the travel lane side, the processor sets the display position of the guidance display at the near side of the intersection. For example, in a case in which the left side of the travel path is the travel lane, the guidance display is set at the near left side of the intersection. On the other hand, in a case in which the other travel path exists at the oncoming lane side, the processor sets the display position of the guidance display at the far side of the intersection. For example, in a case in which the right side is the oncoming lane, the guidance display is set at the far right side of the intersection. In accordance with this display control device, the guidance display can be set at the travel lane side of the other travel path, thereby enabling the sightline of the driver to be guided in the direction in which the vehicle will travel from here on.

A display control device of a fifth aspect is the display control device of any one of the first through fourth aspects, the processor displays the guidance display at the display region while changing the guidance display by animation.

In accordance with the display control device of the fifth aspect, a sense of incongruity with respect to changes in the guidance display can be reduced.

A sixth aspect is a display method, by which a computer executes processing including: acquiring a travel route of a vehicle; in a case in which the vehicle, traveling on a travel path, changes a travel direction to another travel path, setting a display position of a guidance display, which guides the travel direction with respect to a display region of a display unit, on the basis of a positional relationship between the display region and the other travel path; and displaying the guidance display, the display position of which has been set relative to a view ahead of the vehicle, so as to be superimposed on the display region.

The display method of the sixth aspect is a method that displays a guidance display, which guides the travel direction, on a display region of a display unit so as to be superimposed on the view ahead of a vehicle. In this display method, on the basis of the travel route acquired by the computer, the computer determines, for example, whether or not the vehicle that is traveling on the travel path will change course to another travel path. In a case in which the course is to be changed to another travel path, the computer sets the display position of the guidance display with respect to the display region of the display unit, on the basis of the positional relationship between the display region and the other travel path. Due thereto, for example, in a case in which another travel path on which the vehicle will travel from here on exists in front on the driver's sightline, it is possible to avoid superimposition of the guidance display on the view of the other travel path. Therefore, the annoyance of the guidance display being superimposed on the view of the other travel path can be reduced.

A seventh aspect is a non-transitory storage medium storing a display program. The display program causes a computer to execute processings. The processings include: acquiring a travel route of a vehicle; in a case in which the vehicle, traveling on a travel path, changes a travel direction to another travel path, setting a display position of a guidance display, which guides the travel direction with respect to a display region of a display unit, on the basis of a positional relationship between the display region and the other travel path; and displaying the guidance display, the display position of which has been set relative to a view ahead of the vehicle, so as to be superimposed on the display region.

The display program of the seventh aspect is a program that displays a guidance display, which guides the travel direction, on a display region of a display unit so as to be superimposed on a view ahead of a vehicle. In this program, on the basis of the travel route acquired by the computer, the computer determines, for example, whether or not the vehicle that is traveling on the travel path will change course to another travel path. In a case in which the course is to be changed to another travel path, the computer sets the display position of the guidance display with respect to the display region of the display unit, on the basis of the positional relationship between the display region and the other travel path. Due thereto, for example, in a case in which another travel path on which the vehicle will travel from here on exists in front on the driver's sightline, it is possible to avoid superimposition of the guidance display on the view of the other travel path. Therefore, the annoyance of the guidance display being superimposed on the view of the other travel path can be reduced.

According to the present disclosure, it is possible to carry out display that guides a course change while reducing annoyance.

BRIEF DESCRIPTION OF THE DRAWINGS

Exemplary embodiments of the present disclosure will be described in detail based on the following figures, wherein.

DETAILED DESCRIPTION

Figure 1:
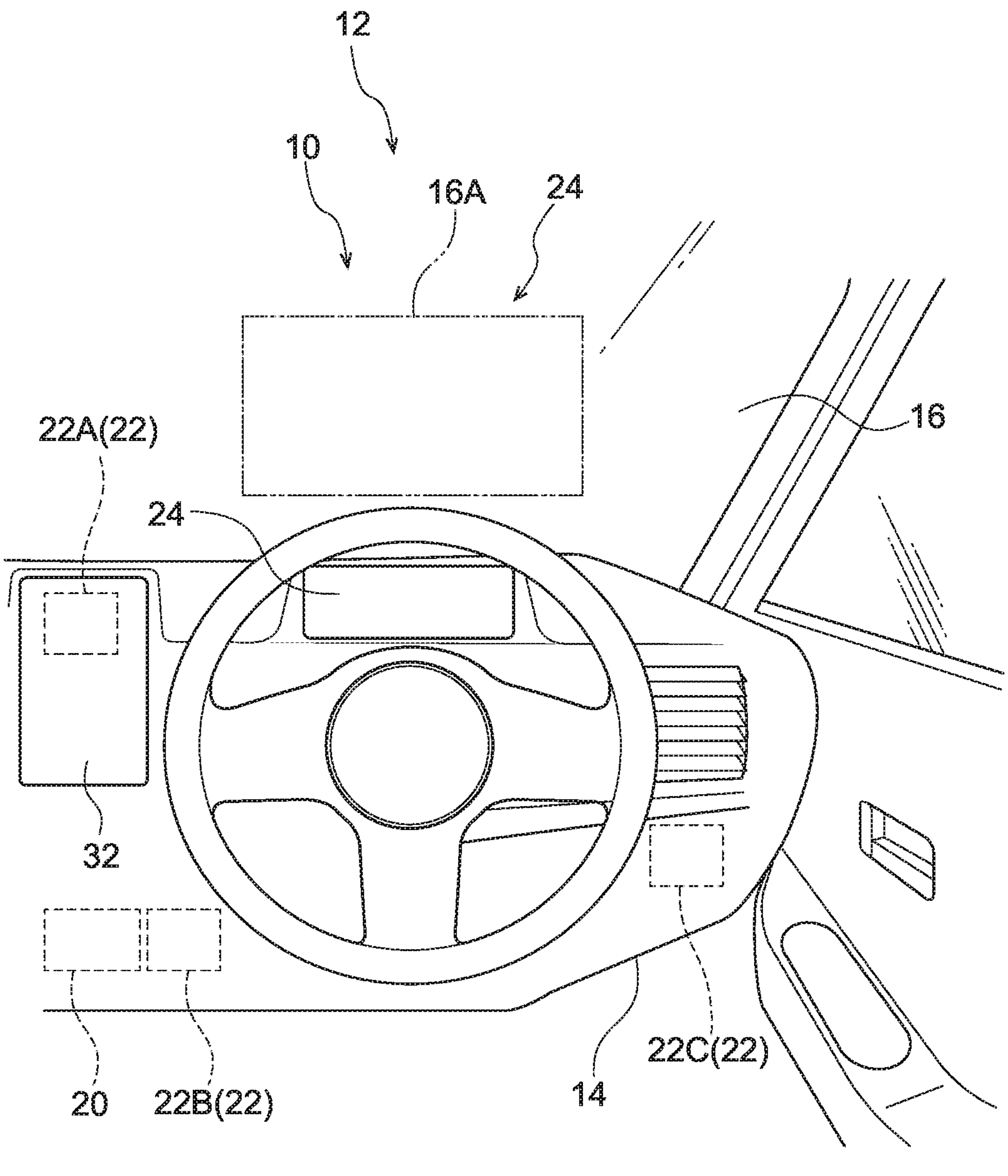
FIG. 1 is a drawing illustrating the schematic structure of a vehicle relating to an exemplary embodiment.

A display device 10 that is an exemplary embodiment of the present disclosure is described hereinafter with reference to the drawings. As illustrated in FIG. 1, the display device 10 of the present exemplary embodiment is installed in a vehicle 12. The display device 10 includes at least a display control device 20, plural electronic control units (ECUs) 22, and a head-up display 24. The display control device 20 and the ECUs 22 are housed inside a dashboard 14. The head-up display 24 that serves as a display unit has a projection surface 16A that is a predetermined area on a front window 16, and displays an image projected from a projection device 26 (see FIG. 2). The projection surface 16A corresponds to the display region of the head-up display 24.

Figure 2:
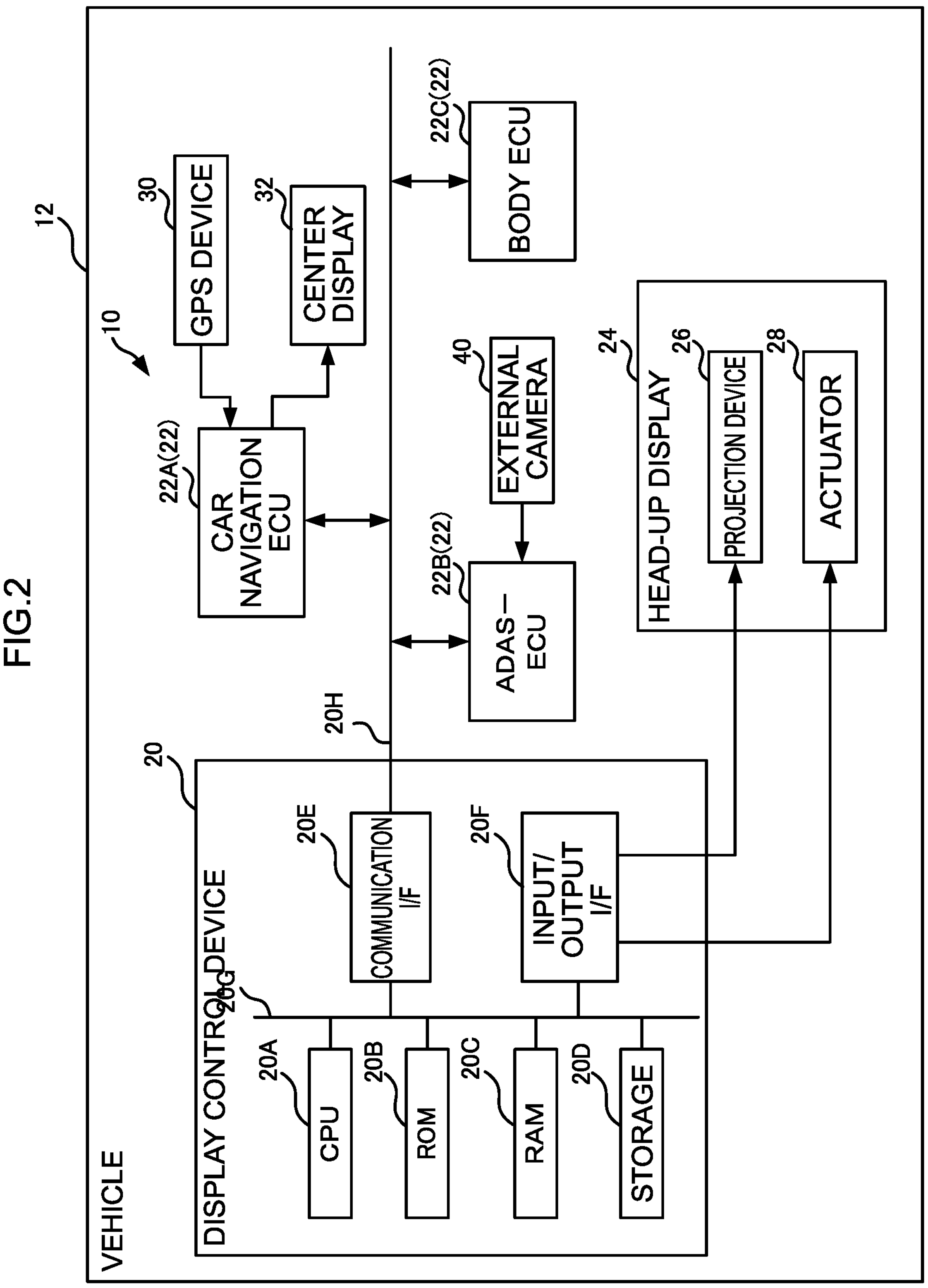
FIG. 2 is a block diagram illustrating a hardware configuration of the vehicle of the exemplary embodiment.

As illustrated in FIG. 2, the respective ECUs 22 and the head-up display 24 are connected to the display control device 20. The ECUs 22 include a car navigation ECU 22A, an ADAS (Advanced Driver Assistance System)-ECU 22B, and a body ECU 22C.

The car navigation ECU 22A controls the car navigation system. A GPS device 30 and a center display 32 are connected to the car navigation ECU 22A. The GPS device 30 is a device that measures the current position of the vehicle 12. The GPS device 30 includes an antenna that receives signals from GPS satellites. Note that the GPS device 30 may be directly connected to the display control device 20. The center display 32 is a liquid crystal display that displays a map and a mark indicating the current position of the vehicle 12. The center display 32 is provided at a vehicle transverse direction central portion of the dashboard 14.

The ADAS-ECU 22B performs overall control of the advanced driver assistance system. An external camera 40 that captures images of at least the region in front of the vehicle 12 is connected to the ADAS-ECU 22B. Further, actuators that drive the brake and the accelerator respectively are connected to the ADAS-ECU 22B. Note that the external camera 40 may be directly connected to the display control device 20.

The body ECU 22C controls the wipers and the lights. The body ECU 22C is connected to, for example, the switches for the headlights, the turn signals, and the like.

The head-up display 24 is structured to include the projection device 26 and an actuator 28. The actuator 28 is a driving device for adjusting the angle of a mirror that reflects an image projected from the projection device 26, and the distance between the mirror and the projection device 26.

The display control device 20 is structured to include a CPU (Central Processing Unit) 20A, a ROM (Read Only Memory) 20B, a RAM (Random Access Memory) 20C, a storage 20D, a communication I/F (interface) 20E, and an input/output I/F 20F. The CPU 20A, the ROM 20B, the RAM 20C, the storage 20D, the communication I/F 20E, and the input/output I/F 20F are connected so as to be able to communicate with one another via an internal bus 20G.

The CPU 20A is a central processing unit, and executes various programs and controls various sections. Namely, the CPU 20A reads-out programs from the ROM 20B, and executes the programs by using the RAM 20C as a workspace.

Figure 3:
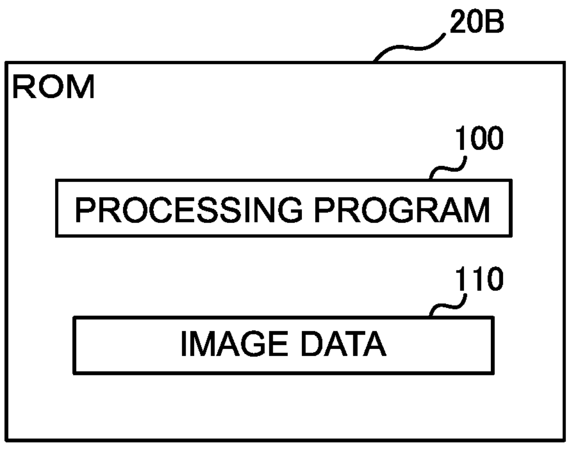
FIG. 3 is a block diagram illustrating a configuration of a ROM in a display control device of the exemplary embodiment.

The ROM 20B stores various programs and various data. As illustrated in FIG. 3, the ROM 20B of the present exemplary embodiment stores a processing program 100 and image data 110. Note that the processing program 100 and the image data 110 may be stored in the storage 20D.

The processing program 100 that serves as a display program is a program for performing superimposition processing that is described later. The image data 110 is data that stores animation images to be displayed on the head-up display 24.

As illustrated in FIG. 2, the RAM 20C temporarily stores programs and data as a workspace.

The storage 20D is structured by an HDD (Hard Disk Drive) or an SSD (Solid State Drive), and stores various programs and various data.

The communication I/F 20E is an interface for connection with the respective ECUs 22. This interface employs a communication protocol based on the CAN protocol. The communication I/F 20E is connected to the respective ECUs 22 via an external bus 20H.

The input/output I/F 20F is an interface for communicating with the projection device 26 and the actuator 28 that structure the head-up display 24.

Figure 4:
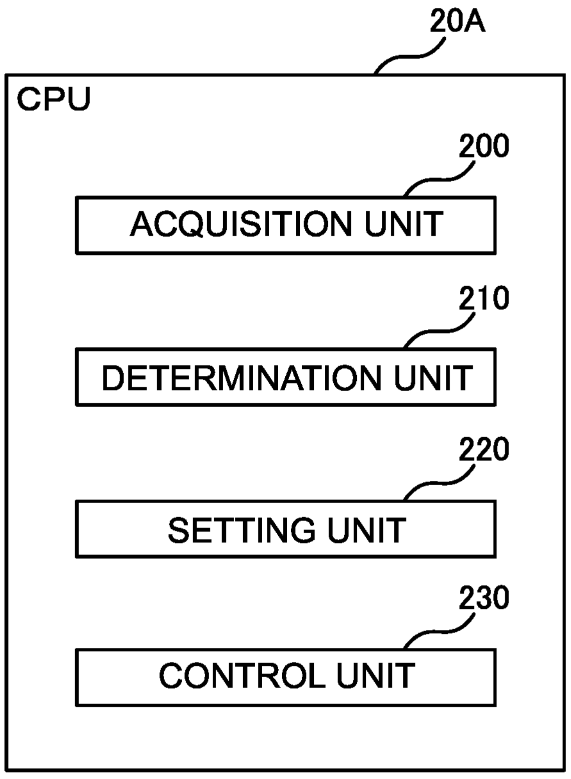
FIG. 4 is a block diagram illustrating a functional configuration of a CPU in the display control device of the exemplary embodiment.

As illustrated in FIG. 4, in the display control device 20 of the present exemplary embodiment, due to the CPU 20A executing the processing program 100, the CPU 20A functions as an acquisition unit 200, a determination unit 210, a setting unit 220, and a control unit 230.

The acquisition unit 200 acquires information relating to a travel route of the vehicle 12, and image information relating to images captured by the external camera 40. Information relating to the travel route is acquired from the car navigation ECU 22A. Image information relating to the images captured by the external camera 40 is acquired from the ADAS-ECU 22B.

Based on the travel route, the determination unit 210 determines whether or not it is necessary to carry out a course change from a first travel path T1, on which the vehicle 12 is traveling, to an arbitrary second travel path T2, or, in other words, whether or not it is necessary to perform a left or a right turn. Here, the first travel path T1 is the road on which the vehicle 12 is currently traveling and is an example of the travel path, and the second travel path T2 is the road onto which the vehicle 12 will change its travel direction along the travel route, and is an example of the other travel path.

Further, the determination unit 210 determines whether or not the second travel path T2, onto which the travel direction will be changed from the first travel path T1, exists inside of the projection surface 16A serving as the display region, or exists outside of the projection surface 16A. Whether or not the second travel path T2 exists inside the projection surface 16A or outside the projection surface 16A is determined based on whether or not a main portion of the second travel path T2 is included in the foreground of the viewpoint of the driver on the projection surface 16A. The main portion includes the range of the distance from intersection C until the course change has been completed (e.g., until the turn signal turns off), and ranges of predetermined distances, and the like.

The determination unit 210 may determine whether or not the main portion of the second travel path T2 is included in the foreground of the viewpoint of the driver based on a sightline camera of the driver, or based on three-dimensional coordinates in a virtual space that is described hereinafter.

Moreover, in a case in which the projection surface 16A is large with respect to the front window 16, there is the possibility that the second travel path T2 will always be included in the foreground at the driver's viewpoint from far ahead of the course change. In this case, a predetermined determination region may be provided for the projection surface 16A, and the determination unit 210 may determine whether or not the second travel path T2 is included in the determination region.

The setting unit 220 has the function of setting mark M (see FIG. 5 to FIG. 7) on a three-dimensional coordinate in order to prompt a course change. More specifically, based on the captured images, the setting unit 220 disposes the travel path that is currently being traveled, other vehicles, and pedestrians in a virtual space, and sets a three-dimensional coordinate such that the mark M that is the guidance display is disposed at a predetermined position in the virtual space. Accordingly, in a case in which the vehicle 12 that is traveling on the first travel path T1 changes its travel direction onto the second travel path T2, the setting unit 220 sets the display position of the mark M that is to be superimposed on the view ahead of the vehicle 12.

In a case in which the second travel path T2 exists outside the projection surface 16A, the setting unit 220 sets the display position of the mark M at the second travel path T2 side of the projection surface 16A. In a case in which the display position of the mark M is set at the second travel path T2 side of the projection surface 16A, the setting unit 220 performs the following setting.

Figure 5:
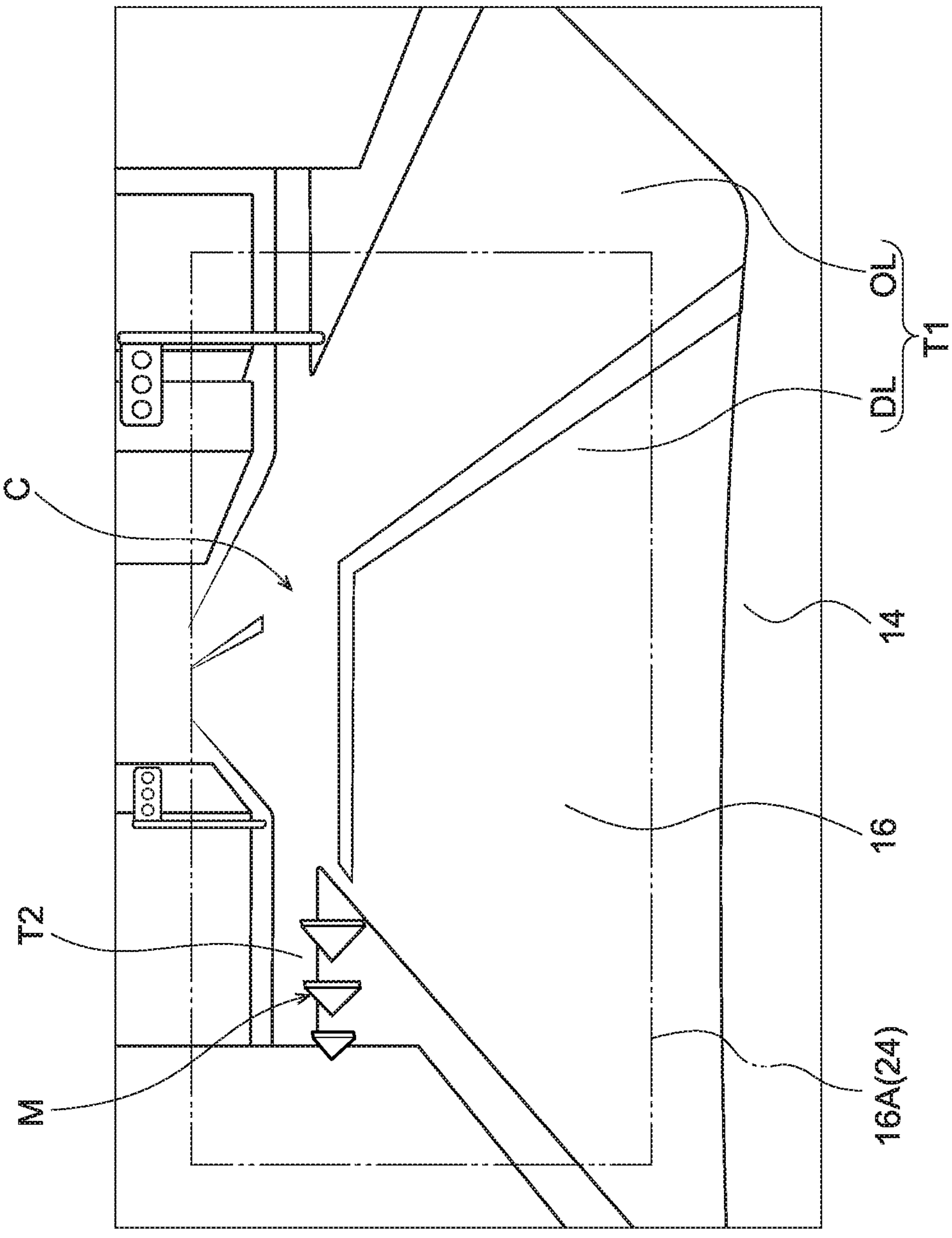
FIG. 5 is a drawing illustrating a display example of mark M in the exemplary embodiment.

In a case in which the second travel path T2 exists at travel lane DL side at the first travel path T1 that includes the travel lane DL and oncoming lane OL, the setting unit 220 sets the display position of the mark M at the near side of the intersection C between the first travel path T1 and the second travel path T2. Due thereto, as illustrated in FIG. 5, in a case in which the vehicle 12 changes course to the travel lane DL side, i.e., in a case in which the vehicle 12 turns left while traveling on the left side of the road, the mark M is disposed in the corner that is at the left side and the near side of the intersection C at the projection surface 16A.

Figure 6:
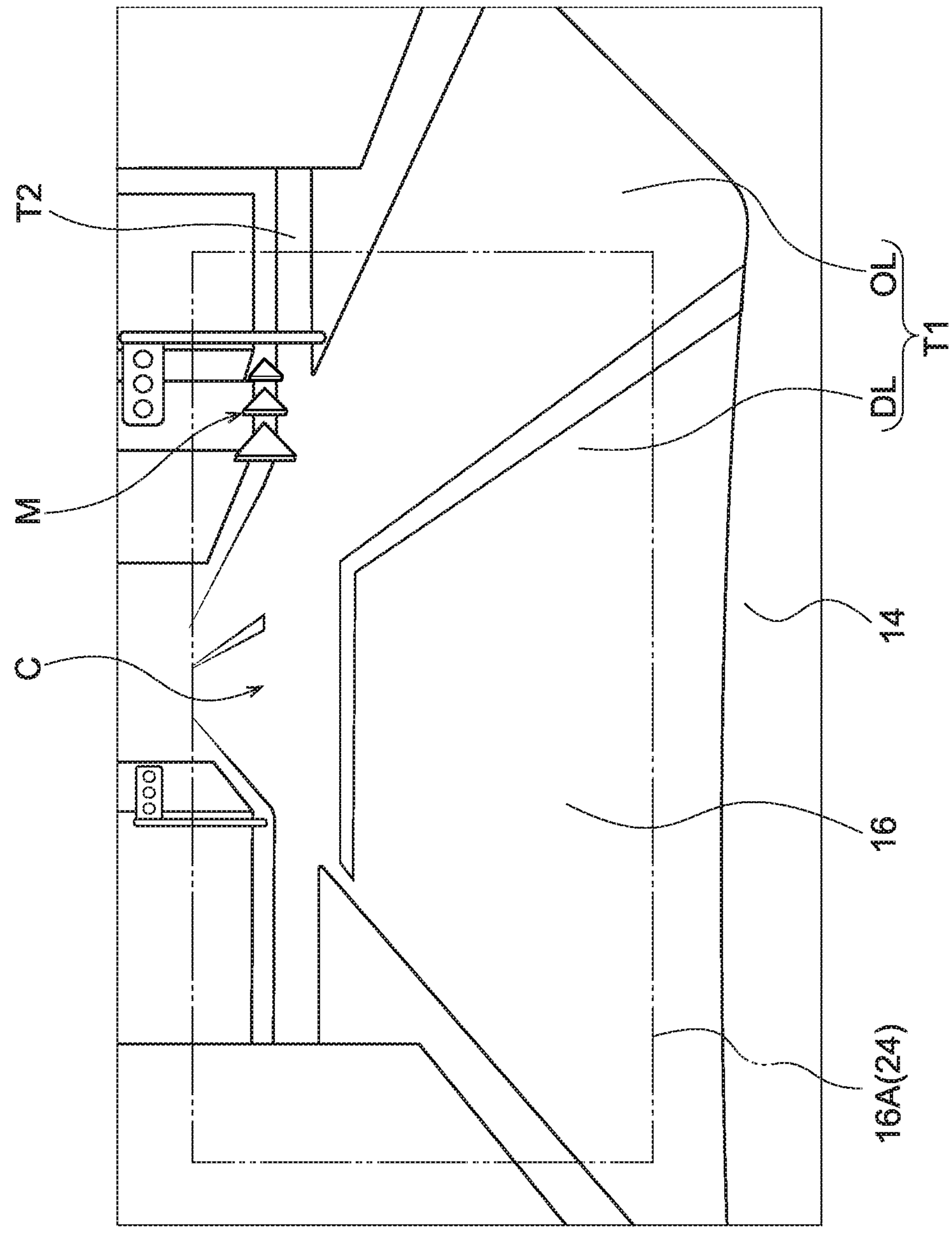
FIG. 6 is a diagram illustrating a display example of the mark M in the exemplary embodiment.

Moreover, in a case in which the second travel path T2 exists at the oncoming lane OL side, the setting unit 220 sets the display position of the mark M at the far side of the intersection C. Due thereto, as illustrated in FIG. 6, in a case in which the vehicle 12 changes course to the oncoming lane OL side, i.e., in a case in which the vehicle 12 turns right while traveling on the left side of the road, the mark M is disposed in the corner that is at the right side and the far side of the intersection C at the projection surface 16A.

Figure 7:
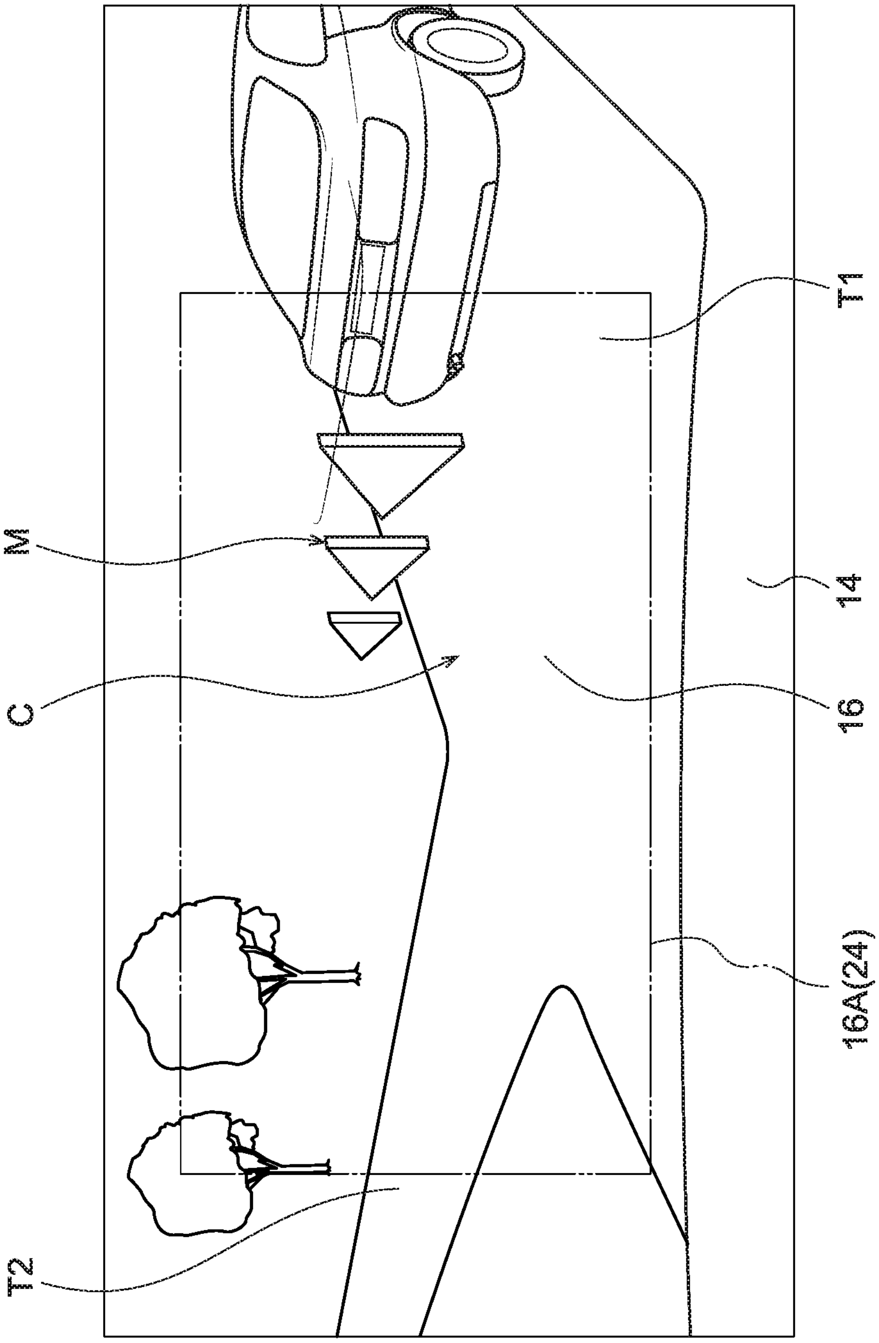
FIG. 7 is a diagram illustrating a display example of the mark M in the exemplary embodiment.

Moreover, in a case in which the second travel path T2 exists inside the projection surface 16A, the setting unit 220 sets the display position of the mark M at the first travel path T1 side of the projection surface 16A. Due thereto, as illustrated in FIG. 7, in a case in which the vehicle 12, which is being steered toward the right along the first travel path T1 that is a roundabout, must turn left, the mark M is disposed at the first travel path T1 side of the projection surface 16A.

The control unit 230 displays the mark M, whose display position has been set, at the view ahead of the vehicle 12 and so as to be superimposed on the projection surface 16A. This mark M is stored in the image data 110 as, for example, an animated video.

(Flow of Control)

The flows of the superimposition processing and the coordinate setting processing executed by the display control device 20 of the present exemplary embodiment are described with reference to FIG. 8 and FIG. 9. The superimposition processing and the coordinate setting processing are executed due to the CPU 20A functioning as the acquisition unit 200, the determination unit 210, the setting unit 220, and the control unit 230.

Figure 8:
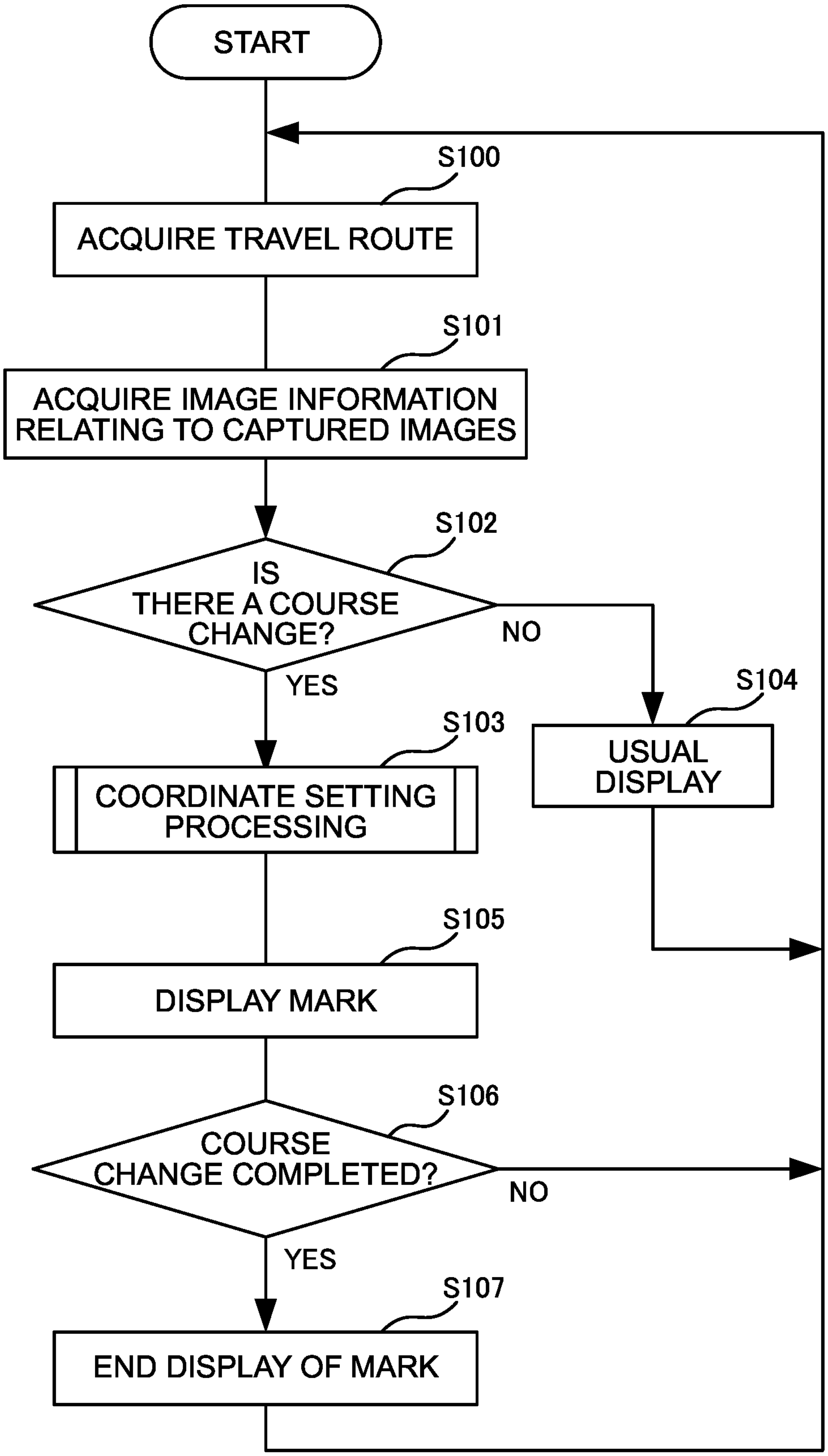
FIG. 8 is a flowchart illustrating the flow of superimposition processing in the display control device of the exemplary embodiment.

In step S100 in FIG. 8, the CPU 20A acquires the travel route of the vehicle 12 from the car navigation ECU 22A.

In step S101, the CPU 20A acquires image information relating to the images captured by the external camera 40.

In step S102, the CPU 20A determines whether or not there is a course change. More specifically, the CPU 20A determines whether or not there is a course change from the first travel path T1 to the second travel path T2 at the intersection C. In a case in which the CPU 20A determines that there is a course change (in a case in which step S102 is YES), processing proceeds to step S103. On the other hand, in a case in which the CPU 20A determines that there is no course change (in a case in which step S102 is NO), processing proceeds to step S104.

In step S103, the CPU 20A executes coordinate setting processing. Details are described later.

In step S104, the CPU 20A executes usual display. Namely, the CPU 20A causes the usual navigation image or the like to be displayed on the projection surface 16A. Then, processing returns to step S100.

In step S105, the CPU 20A displays the mark M on the projection surface 16A. This mark M is displayed by animated video. For example, in FIG. 7, an animation is performed in which the display of the substantially triangular shapes that structure the mark M become larger in order in the travel direction, or become brighter in order in the travel direction.

In step S106, the CPU 20A determines whether or not the course change has been completed. In a case in which the CPU 20A determines that the course change has been completed (in a case in which step S106 is YES), processing proceeds to step S107. On the other hand, in a case in which the CPU 20A determines that the course change has not been completed (NO In step S106), processing returns to step S100.

In step S107, the CPU 20A ends the display of the mark M. Then, processing returns to step S100.

Next, the flow of the coordinate setting processing of step S103 will be described with reference to the flowchart of FIG. 9.

Figure 9:
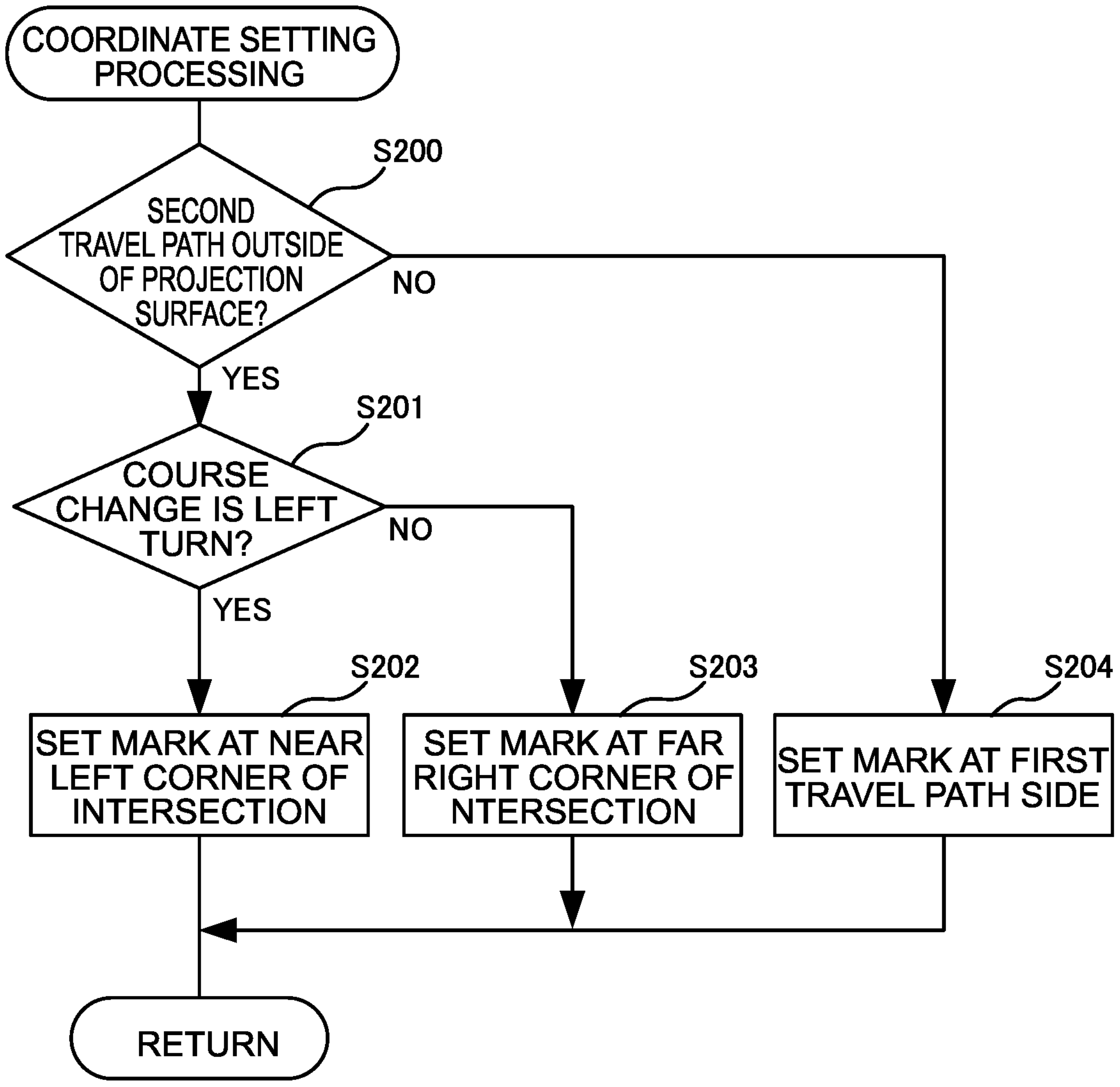
FIG. 9 is a flowchart illustrating the flow of coordinate setting processing in the display control device of the exemplary embodiment.

In step S200 of FIG. 9, the CPU 20A determines whether or not the second travel path T2 exists outside the projection surface 16A. In a case in which the CPU 20A determines that the second travel path T2 exists outside the projection surface 16A (in a case in which step S200 is YES), processing proceeds to step S201. On the other hand, in a case in which the CPU 20A determines that the second travel path T2 does not exist outside the projection surface 16A, i.e., exists inside the projection surface 16A (in a case in which step S200 is NO), processing proceeds to step S204.

In step S201, the CPU 20A determines whether or not the course change is a left turn. In a case in which the CPU 20A determines that the course change is a left turn (in a case in which step S201 is YES), processing proceeds to step S202. On the other hand, in a case in which the CPU 20A determines that the course change is not a left turn, i.e., is a right turn (in a case in which step S201 is NO), processing proceeds to step S203.

In step S202, the CPU 20A sets the mark M at the near left corner of the intersection C. Then, the CPU 20A ends the coordinate setting processing, and returns to the superimposition processing.

In step S203, the CPU 20A sets the mark M at the far right corner of the intersection C. Then, the CPU 20A ends the coordinate setting processing, and returns to the superimposition processing.

In step S204, the CPU 20A sets the mark M at the side of the first travel path T1 on which the vehicle is currently traveling. Then, the CPU 20A ends the coordinate setting processing, and returns to the superimposition processing.

SUMMARY

The display control device 20 of the present exemplary embodiment is structured to display a mark M, which is a guidance display that guides the travel direction, on the projection surface 16A of the head-up display 24 so as to be superimposed on the view ahead of the vehicle 12.

In the present exemplary embodiment, in a case in which the second travel path T2 exists outside the projection surface 16A, the CPU 20A sets the display position of the mark M at the second travel path T2 side of the projection surface 16A. As illustrated in FIG. 5 and FIG. 6, in a case in which the vehicle 12 is traveling at the near side of intersection C, the second travel path T2 does not exist in front on the driver's sightline. Therefore, even though the mark M is displayed so as to be superimposed on the view of the second travel path T2, there is less feeling of annoyance. On the other hand, in a case in which the second travel path T2 exists inside the projection surface 16A, the CPU 20A sets the display position of the mark M at the first travel path T1 side of the projection surface 16A. As a result, as illustrated in FIG. 7, because the mark M is not superimposed on the view of the second travel path T2, the second travel path T2 is not obstructed in the driver's sightline, and annoyance of the display can be reduced.

Moreover, in the display control device 20 of the present exemplary embodiment, in a case in which the second travel path T2 exists at the side of travel lane DL, the CPU 20A sets the display position of the mark M at the near side of the intersection C. For example, in a case in which the left side is the travel lane DL, the mark M is set at the near left side of the intersection C (see FIG. 5). On the other hand, in a case in which the second travel path T2 exists at the side of oncoming lane OL, the CPU 20A sets the display position of the mark M at the far side of the intersection C. For example, in a case in which the right side is the oncoming lane OL, the mark M is set at the far right side of the intersection C. In accordance with the present exemplary embodiment, the mark M can be set at the travel lane DL side of the second travel path T2, thereby enabling the driver's sightline to be guided in the direction in which the vehicle 12 will be traveling from here on.

Moreover, in accordance with the present exemplary embodiment, the animated display of the mark M can reduce the sense of incongruity with respect to changes in display of the mark M during travel.

Other Exemplary Embodiments

In the above exemplary embodiment, the determination unit 210 determines whether or not the second travel path T2, onto which the direction will be changed from the first travel path T1, exists inside or outside the projection surface 16A that serves as the display region, and the setting unit 220 sets the display position of the mark M on the basis of this the determination. However, the present disclosure is not limited to this, and, as another exemplary embodiment, there may be a structure in which the determination unit 210 determines whether or not the second travel path T2, onto which the travel direction is changed from the first travel path T1, is viewable, and the setting unit 220 sets the display position of the mark M on the basis of this determination.

Note that "is viewable" refers to a state in which it is possible to confirm the traffic situation, road surface situation, obstacles, and the like of the second travel path T2, which the vehicle 12 will be traveling on from here on, from the first travel path T1 that is currently being traveled. Accordingly, "is not viewable" means a state in which the traffic situation, road surface situation, obstacles, and the like of the second travel path T2 cannot be confirmed.

In this other exemplary embodiment, operation and effects that are similar to those of the above-described exemplary embodiment are exhibited, except that the processing of determining whether or not the second travel path T2 is not viewable is carried out in step S200 of FIG. 9. Namely, in a case in which the second travel path T2 that will be traveled from here on exists in front on the sightline of the driver, because the mark M is not superimposed on the view of the second travel path T2, annoyance of the display can be reduced.

[Notes]

Although the present exemplary embodiment is structured such that the mark M is displayed so as to be superimposed on the view ahead of the vehicle 12 viewed through the front window 16, the present disclosure is not limited to this, and the mark M may be displayed so as to be superimposed on a captured image of the view ahead of the vehicle 12. For example, in a case in which images captured by the external camera 40 that structures the imaging unit can be displayed on the center display 32, the mark M can be displayed so as to be superimposed on the captured images of the view ahead of the vehicle 12. In this case as well, it is possible to guide the course change while reducing annoyance for the driver who views the center display 32.

Alternatively, the mark M may be displayed in a superimposed manner in a wearable device such as augmented reality (AR) glasses or a head-mounted display. In this case, the driver wearing the wearable device can ascertain the mark M that is superimposed on the view ahead of the vehicle 12 that is being viewed through a screen or the like in front of the eyes. In this case as well, it is possible to guide the course change while reducing annoyance for the driver.

Note that the various processing executed by the CPU 20A reading and executing software (a program) in the above exemplary embodiments may be executed by various types of processors other than a CPU. Examples of processors in this case are Programmable Logic Devices (PLDs) whose circuit structure can be modified after production such as Field-Programmable Gate Arrays (FPGAs) and the like, and dedicated electric circuits that are processors having circuit structures designed for the sole purpose of executing specific processings, such as Application Specific Integrated Circuits (ASICs) or the like, or the like. The above-described processings may be executed by any one of these various types of processors, or by a combination of two or more of the same type or different types of processors (e.g., plural FPGAs, or a combination of a CPU and an FPGA, or the like). Further, the hardware structures of these various types of processors are, more specifically, electric circuits that combine circuit elements such as semiconductor elements and the like.

The above exemplary embodiments describe aspects in which the respective programs are stored in advance (installed) on a non-transitory storage medium readable by a computer. For example, the processing program 100 in the display control device 20 is stored in advance in the ROM 20B. However, the present disclosure is not limited to this, and the respective programs may be provided in the form of being stored on a non-transitory storage medium such as a CD-ROM (Compact Disc Read Only Memory), a DVD-ROM (Digital Versatile Disc Read Only Memory), a USB (Universal Serial Bus) memory, or the like. Alternatively, the programs may be provided in a form of being downloadable from an external device over a network.

The processings in the above exemplary embodiments are not limited to being executed by a single processor, and may be executed by plural processors in cooperation with each other. The flows of processings described in the above exemplary embodiments also are examples, and unnecessary steps may be deleted therefrom, new steps may be added thereto, or the order of the processes may be rearranged, within a scope that does not depart from the gist of the present invention.

What is claimed is:

1. A display control device, comprising:

a processor configured to:

(i) acquire a travel route of a vehicle, the travel route including a first travel path and a second travel path that turns at an intersection from the first travel path;

(ii) when there is a course change from the first travel path to the second travel path at the intersection, determines whether the second travel path exists outside or inside a determination region set in a display region of a display unit, the second travel path being determined to exist inside the determination region when a main portion of the second travel path is included in a foreground of a viewpoint of a driver on the display region, the main portion of the second travel path including a range of a distance from the intersection until the course change has been completed;

(iii) set a display position on the display region of a guidance display that guides the vehicle at a corner that is at a left side and a near side of the intersection of the display region when the second travel path exists outside the determination region and the course change is a left turn;

(iv) set the display position of the guidance display at a corner that is at a right side and a far side of the intersection of the display region when the second travel path exists outside the determination region and the course change is a right turn;

(v) set the display position of the guidance display at a side of the first travel path in the display region when the second travel path exists inside the determination region;

(vi) display the guidance display, the display position of which has been set relative to a view ahead of the vehicle, so as to be superimposed on the display region; and (vii) repeat the above (i) to (vi).

2. The display control device of claim 1, wherein the processor displays the guidance display at the display region while changing the guidance display by animation.

3. The display control device of claim 1, wherein the view ahead is an image captured by a camera installed in the vehicle, and the processor displays the guidance display at the display region so as to be superimposed on the captured image.

4. A display method, by which a computer executes processing comprising:

(i) acquiring a travel route of a vehicle, the travel route including a first travel path and a second travel path that turns at an intersection from the first travel path;

(ii) when there is a course change from the first travel path to the second travel path at the intersection, determining whether the second travel path exists outside or inside a determination region set in a display region of a display unit, the second travel path being determined to exist inside the determination region when a main portion of the second travel path is included in a foreground of a viewpoint of a driver on the display region, the main portion of the second travel path including a range of a distance from the intersection until the course change has been completed;

(iii) setting a display position on the display region of a guidance display that guides the vehicle at a corner that is at left side and a near side of the intersection of the display region when the second travel path exists outside the determination region and the course change is a left turn;

(iv) setting the display position of the guidance display at a corner that is at a right side and a far side of the intersection of the display region when the second travel path exists outside the determination region and the course change is a right turn;

(v) setting the display position of the guidance display at a side of the first travel path in the display region when the second travel path exists inside the determination region;

(vi) displaying the guidance display, the display position of which has been set relative to a view ahead of the vehicle, so as to be superimposed on the display region; and (vii) repeating the above (i) to (vi).

5. A non-transitory storage medium storing a display program executable by a computer to perform processing, the processing comprising:

(i) acquiring a travel route of a vehicle the travel route including a first travel path and a second travel path that turns at an intersection from the first travel path;

(ii) when there is a course change from the first travel path to the second travel path at the intersection, determining whether the second travel path exists outside or inside a determination region set in a display region of a display unit, the second travel path being determined to exist inside the determination region when a main portion of the second travel path is included in a foreground of a viewpoint of a driver on the display region, the main portion of the second travel path including a range of a distance from the intersection until the course change has been completed;

(iii) setting a display position on the display region of a guidance display that guides the vehicle at a corner that is at a left side and a near side of the intersection of the display region when the second travel path exists outside the determination region and the course change is a left turn;

(iv) setting the display position of the guidance display at a corner that is at a right side and a far side of the intersection of the display region when the second travel path exists outside the determination region and the course change is a right turn;

(v) setting the display position of the guidance display at a side of the first travel path in the display region when the second travel path exists inside the determination region;

(vi) displaying the guidance display, the display position of which has been set relative to a view ahead of the vehicle, so as to be superimposed on the display region; and (vii) repeating the above (i) to (vi).

* * * * *